United States Patent [19]

Minshull et al.

[11] Patent Number: 4,642,790

[45] Date of Patent: Feb. 10, 1987

[54] PRESENTATION SPACE MANAGEMENT AND VIEWPORTING ON A MULTIFUNCTION VIRTUAL TERMINAL

[75] Inventors: John F. Minshull, Winchester, England; Martin C. Pinnell, Dalkeith, Australia

[73] Assignee: International Business Machines Corporation, Armonk, N.Y.

[21] Appl. No.: 589,381

[22] Filed: Mar. 14, 1984

[30] Foreign Application Priority Data

Mar. 31, 1983 [EP] European Pat. Off. ........ 83301868.2

[51] Int. Cl.[4] .................................................. G06F 3/00

[52] U.S. Cl. .................................... 364/900; 340/723; 340/724; 340/726; 340/734; 340/747; 340/750

[58] Field of Search ............... 340/723, 724, 726, 734, 340/747, 750; 364/521, 518, 200, 300, 900 MS File

[56] References Cited

U.S. PATENT DOCUMENTS

| | | | |
|---|---|---|---|
| 4,500,875 | 2/1985 | Schmitz | 340/723 X |
| 4,555,775 | 11/1985 | Pike | 364/900 |

FOREIGN PATENT DOCUMENTS

| | | | |
|---|---|---|---|
| 0043391 | 1/1982 | European Pat. Off. | 364/900 |
| 2030827 | 4/1980 | United Kingdom | 364/900 |

OTHER PUBLICATIONS

Electronic Design, vol. 28, No. 10, May 1980, pp. 205-208, S. R. Johnson: "Fast Raster-Scan System Displays Graphics and Images".

IBM Technical Disclosure Bulletin, vol. 19, No. 3, Aug. 1976, pp. 1085-1086, D. H. Fritz: "Dynamic Window/-Viewport Relocation".

IBM Technical Disclosure Bulletin, vol. 23, No. 7A, Dec. 1980, pp. 3035-3036, D. F. Bantz et al: "Overlapping Viewport Management".

*Primary Examiner*—Raulfe B. Zache

*Attorney, Agent, or Firm*—Frederick D. Poag

[57] ABSTRACT

An interactive display system includes a display terminal on which an operator may display the data contained in windows (14.1, 14.2 . . .) on formatted application data (PS 1, PS 2 . . .) in selected viewports (15.1, 15.2 . . .) on the screen 13. The system is provided with storage (4), both real and virtual, into which a presentation interface service (2) loads dynamically the entire formatted data (PS 1, PS 2 . . .) of each application (list 1, list 2 . . .) as it is invoked by the user. A screen manager (7) maps the data contained in the defined windows into locations (16.1, 16.2 . . .) of a programmable symbol refresh buffer (6, 8) determined by the corresponding position of viewports (15.1, 15.2 . . .) on the screen defined by the user and through which the windows are to be viewed.

14 Claims, 20 Drawing Figures

PRESENTATION SPACE MANAGEMENT AND VIEWPORTING ON A MULTIFUNCTION VIRTUAL TERMINAL

BACKGROUND OF THE INVENTION

1. Field of the Invention

The invention relates to an interactive display system of the kind having a refresh raster or matrix addressed display device and incorporating a 'windowing' process by which means specified portions or 'windows' of application data may be selected and transformed to be displayed in a predetermined region or 'viewport' on the screen of the display device.

2. Description of the Prior Art

Such interactive display systems are well known as can be verified by reference to standard text books on the subject such as "Principles of Interactive Computer Graphics" by Newman and Sproull, 2nd Edition 1979 and "Fundamentals of Interactive Computer Graphics" by Foley and Van Damm 1982. In these text books the term 'world coordinate system' is used for the space in which the picture specified by the application is defined, and the term 'viewing transformation' for the transformation that converts this picture into screen coordinates. The world coordinate system is chosen to suit the application program whereas the screen coordinate system is inherent in the design of the display. The viewing transformation forms a bridge between the two and in general allows any desired scaling, rotation, and translation to be applied to the world-coordinate definition of the picture. The less general case, in which no rotation is applied by the viewing transformation is called the window transformation.

The windowing transformation is so named because it involves specifying the 'window' in the world coordinate space surrounding the information required to be displayed. In addition to the 'window', a 'viewport' or region on the screen in which the 'window' contents are to be displayed can be defined. Generally speaking the viewport is a rectangle on the screen and may correspond to the full screen dimensions but is often considerably less. By using a viewport smaller than the full screen, room is left for other data such as menus, text messages each of which may be displayed in its own separate viewport.

In this terminology, the window is used to define what is to be displayed and the viewport specifies where on the screen it is to be displayed. Such scanning systems enable a user to perform a variety of operations, for example scanning over a large picture keeping the window size constant and varying its position with respect to the larger picture or changing the picutre magnification by changing the window size but keeping the viewport size constant. Techniques for performing these windowing transformations involving such programming devices as clipping algorithms, for example, are not regarded as forming part of the present invention and since such techniques are adequately described in the aforementioned text books and well known in the industry, detail of their implementation is not regarded as being necessary to the understanding of the present invention to be described herein, and consequently will not be given.

SUMMARY OF THE INVENTION

The present invention is concerned, not with the specific details of converting the data from coded form in which it is generated or received, to non-coded form for display, nor with the mechanism for performing the transformation from specified windows to viewport, but with the particular system management and control programs which control the movement and storage of application data within the system in such a way that the application progresses are, to all interests and purposes, totally independent of the real display system.

Data generated by or supplied to a system in the course of the performance of an application (text, graphics, image or mixtures of all three) is generally in the form of coded display lists. Thus, during performance of a text application, textual information as entered for example from an input keyboard by a user may be accumulated as lists of EBCDIC or ASCII characters. During a graphics application, the individual lines constituting the graphics picture may be held as lists of vector orders.

In one system exemplary of the state of the art the application program itself performs all the operations on the application data needed during performance of the application. Thus the application program formats the application data to the specific lay-out required on the screen for display of a selected window in a defined viewport. This formatted information is then copied in the screen refresh buffer as a mapped representation of the data as it is required to appear on the screen. Should the position of the window relative to the application data change, for example during scanning of the window over the more extensive application data, or when the dimensions or location of the viewport on the screen change, or a new window on the same or different application data is requested, or when an existing window is deleted, then in each and every case, reference is made back to the associated application program, the formatting procedure required as a result of the changed circumstances is re-executed and the new formatted data copied in place of the old in the refresh buffer. Clearly interactive processes performed by a user at a terminal such a moving a viewport on the screen or moving a window over the application data impose considerably processing demands on the CPU running the application program. Often the process cannot be performed at the required rate resulting in time delays, probably blanking of the screen, and general dissatisfaction of the user. The problem is aggravated with those systems in which the terminal does not have in-built processing power, or only little processing power, and relies on a CPU in a remote host for all or most operations.

U.S. Pat. No. 4.070,710 describes a computer graphics display system which alleviates the problem to some extent by formatting data supplied from a host CPU within a terminal system itself and storing the formatted data on a bit-per-pel basis in a random access memory of the terminal. The capacity of the random access memory exceeds the display area of the screen and a control unit for the display selects portions of data stored in the RAM for display in pre-determined regions on the screen.

The problem with this arrangement is that the information available for display on the screen in limited to that which can be selected from the data stored in the random access memory. Thus, although the information content of this RAM exceeds that of the screen, in practical terms, it does not give the user much freedom of action. In the event that a user wishes to display information on the screen not contained in the ramdom access memory, then the required information must be accessed from the programmed host computer, formatted and written in mapped format into an allocated region of the random access memory.

In contrast, an interactive display system in accordance with the present invention completely overcomes the problem by providing sufficient presentation space storage for the terminal, either real or virtual, to provide for on-demand storage and retrieval of bit image representations of all the data formatted by the application or applications invoked by the user (whether or not such bit image representations are or will be displayed). The screen manager has access to this data and is operable in response to user input to identify and map the contents of those presentation space storage locations containing the selected windows of data into the identified viewports on the screen. In order to make economic use of the available presentation space storage, space is only allocated when the applicaion program presents non-null data for display. Furthermore, as a part of presentation space becomes available during use, as a result of the display list being changed by an application program for example, it is recovered to be reallocated as required.

In order that the invention may be fully understood, a preferred embodiment thereof will now be described with reference to the accompanying drawings.

DETAILED DESCRIPTION

Figure 1:
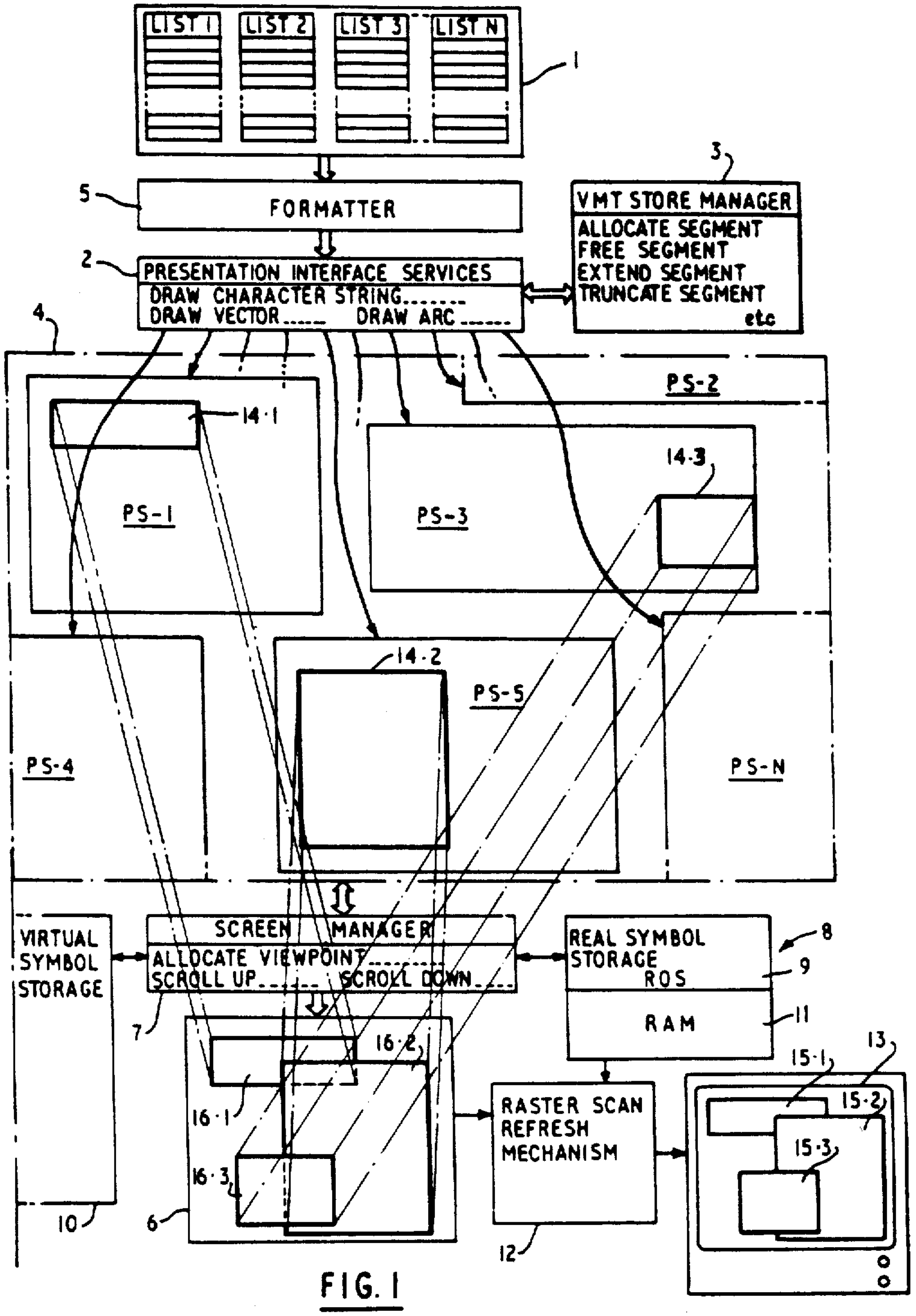
FIG. 1 shows a schematic representation of a portion of an interactive display system according to the invention.

FIG. 1 shows a schematic representation of a portion of an interactive display system according to the invention implemented on a virtual memory terminal (VMT) system such as is described in the European Patent Application No. 43391 published on Jan. 13, 1982 (U.S. Ser. No. 276,771 filed 6/15/81 and assigned to the assignee of this application).

Coded source data generated for example by the system in the course of the performance of one or more applications (text, graphics, image or mixtures of all three) invoked by the operator of the VMT system are held in bulk storage 1 as coded display lists where they are available for access by the operator on request. As stated previously, the display lists may contain lists of EBCDIC or ASCII characters for alpha-numeric applications or lists of vector orders for graphics applications.

Presentation Interface Services 2 operate in conjunction with the VMT Store Manager 3 in response to an operator request for a selected application to allocate and load formatted data produced from the associated display lists into available storage 4 of the VMT. (The VMT storage may include real and virtual storage locations and is shown bounded by a chain dotted box).

The formatting procedure is quite conventional and does not form part of the present invention. Although formatting is performed by the application, in the schematic representation of the system shown in the FIG. 1, it is convenient to show the display lists being processed by an independent formatter represented by block 5.

As fully explained in the aforementioned VMT patent application, data loaded into VMT is fed into a dynamically managed region of random access store of the VMT under control of primitive microprocessor control instructions permanently held in read-only storage. Records copied to a region are contiguously stored as segments in successive free storage locations and are chained together for subsequent access in a plurality of double-threaded chains. The VMT store manager 3 controls the necessary functions to CREATE, MODIFY, and DELETE segments as required by the application and provides for store-through of segements of RAM to a backing store and main store. The store manager also identifies segments within RAM available for deletion from RAM on a least-recently-used basis to provide additional space for new segments.

It is seen therefore that during operation of the system where the operator may wish to display data from one or more applications, the segement containing the associated display lists of application data and the segments containing the formatted representation produced therefrom may become widely distributed throughout real and virtual storage 4 of the VMT. However, for the purposes of the understanding of this invention the storage locations allocated for a formatted representation of application program display data, although in practice possibly dispersed throughout the storage, may be regarded as being a contiguous block of multiple storage locations within the general storage area 4 as shown in FIG. 1 and referenced Presentation Space (PS) 1, PS2 . . . PSN. Once a display list has been accessed by the application, then the presentation interface services places the entire formatted representation in an allocated presentation space within storage for subsequent access by the screen manager to be described hereafter. The parameters which specify the dimensions of each presentation space are supplied by the user application and then the necessary physical storage space is allocated by the presentation interface services without the further involvement of the application. In the design described the total number of concurrently activated presentation spaces is not logically limited but in practice, the field size allocated to the presentation space address may provide a practical limit. This loading of entire formatted representation of application program display data into allocated presentation spaces completes the first phase of the operation of the system.

The second phase of the operation involves the loading of selected portions of the various formatted representations occupying the presentation spaces to a refresh buffer 6 under the control of a screen manager 7 responding to user input instructions. The refresh buffer 6 is mapped buffer such as is used in the IBM (Registered Trade Mark) 3277, 3278, and 8775 display terminals in which, the character or symbol codes or pointers are stored at positions within the buffer corresponding to the display position on the screens. A character/symbol generator 8 contains the acutal bit patterns representative of the different characters or symbols to be displayed. For alpha-numeric characters and some commonly used graphics symbols the corresponding bit pattern cells are permanently held in a read-only section 9 of the character generator 8. During display of a graphics picture for example where bit patterns representing portions of lines are required the cells are initially created and held in assigned locations of virtual storage 10 and copied to a read/write section 11 of character generator 8 when the corresponding symbol code is loaded into the buffer 6. Further details of this part of the operation will be given elsewhere in this specification. During refresh, a raster scan refresh mechanism 12 reads the characters and symbol codes sequentially from the buffer 6 which is sufficiently large to be able to store one character/symbol code or pointer for each character cell on the screen 13. The codes act at pointers to the various bit patterns stored in the character/sumbol generator 8 which are accessed and sent to the screen 13 in a conventional manner.

The viewpoint dimensions and viewport screen positions used to view the contents of a presentation space are determined interactively by the user. Viewport overlay is provided to enable sections of multiple viewports, whose aggregate total areas exceed the total screen area, to be viewed concurrently. Thus in FIG. 1 the buffer 6 contains portions or windows 14.1, 14.2, 14.3 respectively of presentation spaces data contained in windows on presentations space PS. 1, PS.5 and PS.3. This data is subsequently displayed on the screen 13 in correspondingly overlaying viewports 15.1, 15.2, 15.3 as shown.

Thus in response to a user requesting display of data contained in window 14.1 of presentation space PS.1 in viewport 15.1, the screen manager 7 operates to copy the appropriate formatted display data contained in window 14.1 into block 16.1 of storage refresh buffer 6 in the locations defined by the position of the viewport 15.1. If thereafter the user requests display of data contained in window 14.1 of presentation space PS.5 in viewport 15.1 which partially overlays viewport 15.1 then the screen manager 7 operates to copy the appropriate formatted display data contained in window 14.1 into 16.2 of storage in refresh buffer 6 with deletion of the underlying portion of data in block 16.1. Finally, if the user requests display of data contained in window 14.3 of presentation space PS.3 in viewport 15.1 which partially overlaps viewport 15.2, then the screen manager organizes the copying of the data from window 14.3 into block 16.2 of storage with consequential deletion of the underlying data in block 16.2.

In broad outline therefore, the invention is seen to consist of two major mechanisms: (1) the presentation interface services 2 which controls the allocation of presentation spaces for the formatted representations produced from application program coded display lists. (The execution performance for decoding the display lists is much reduced with this implementation as the whole to the display lists is decoded into the presentation space only infrequently.) (2) the screen manager 7 which operates in response to user interaction to transfer selected areas of the presentation space to a viewport or the movement of viewport content to new viewport positions or a combination of both. The trading of increased storage for improved execution performance matches the characteristics of a low-cost terminal but it can be excessively costly in storage if the storage allocation of the terminal is inefficient. For these reasons the invention is ideally suited for implementation on a virtual memory system.

PRESENTATION INTERFACE SERVICES (2)

The presentation interface services contain a set of presentation space instruction which enable the allocation and de-allocation of presentation spaces and the specification of presentation space dimensions and type.

The presentation interface provides both a pel and a cell addressing option in all presentation spaces. Cell addressing is intended for alpha-numeric and text display and has a top-left addressing origin. Pel addressing is intended for graphics, image and character string display and has a bottom left addressing origin. Thus the two addressing systems for the screen identify respectively row-column position for character data where (0, 0) lies at the top left of the screen, and (x, Y) coordinates for graphic data where (0, 0) lies at the bottom left of the screen. For compatibility with the hardware structure ofthe IBM 8775, presentation space cell addressing on VMT is predefined to use cells each consisting of a matrix of 9×16 pels. Presentation space dimensions are requested as an integral number of character cells. With this arrangement, when test is being entered for display it appears initially at the top left of the presentation space and moves progressively across and down the screen in the accepted manner. Conversely when graphic data is entered it appears initially at the bottom left of the presentation space and grows progressively across and up the screen.

Each presentation space allocated is given a unique serial number which is subsequently used by the application to select it for data read or write. It is necessary that the integrity of the presentation space serial numbers is preserved by the system procedures to prevent an application accessing a presentation space, or presentation spaces, which have been allocated to another application.

Figure 2:
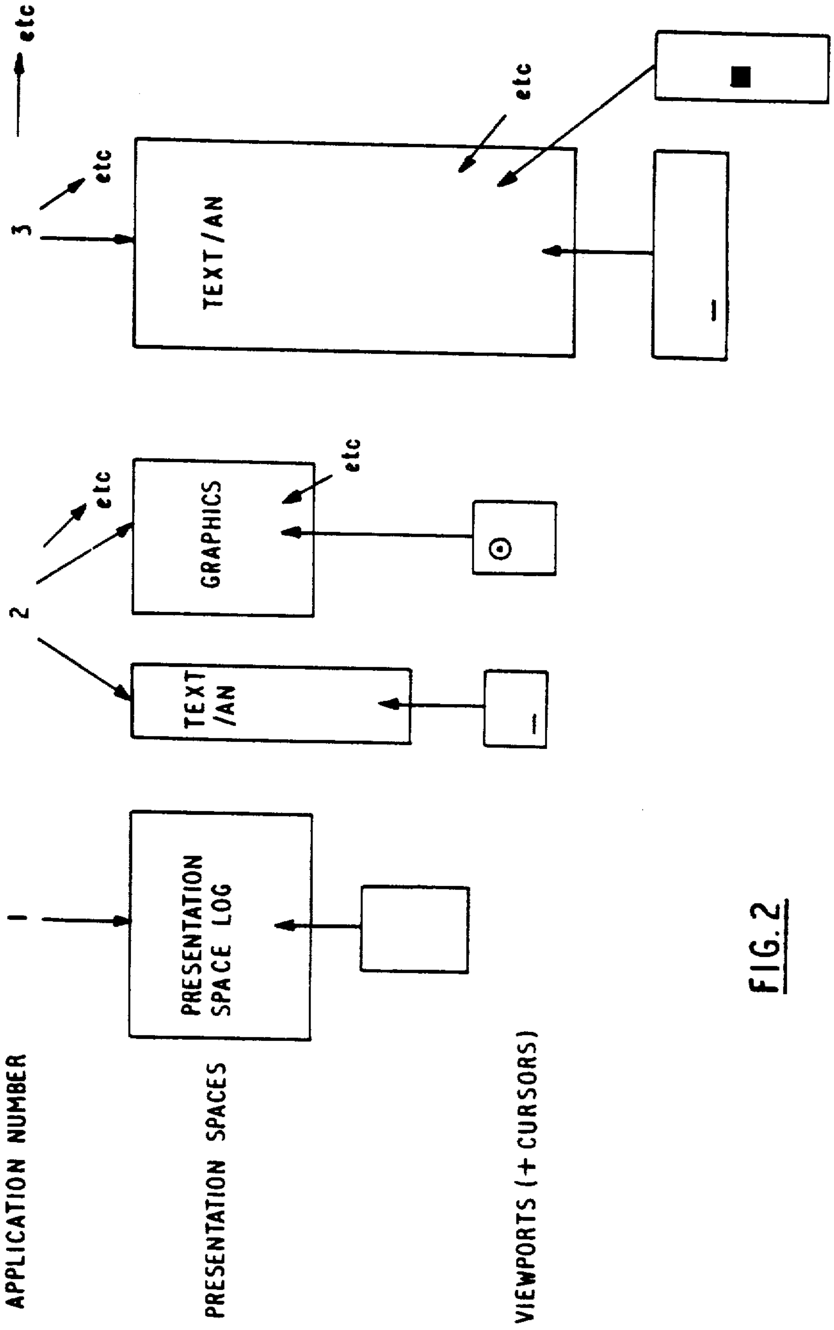
FIG. 2 shows various presentation space and viewport options.

FIG. 2 shows typical presentation space and viewport options. Application No. 1 is a directory of the current allocation of presentation space. Application No. 2 shows an option where multiple presentation spaces have been requested. Application No. 3 shows an option where multiple viewports access a single presentation space. Appropriate cursor symbols are shown associated with the viewports.

Figure 3:
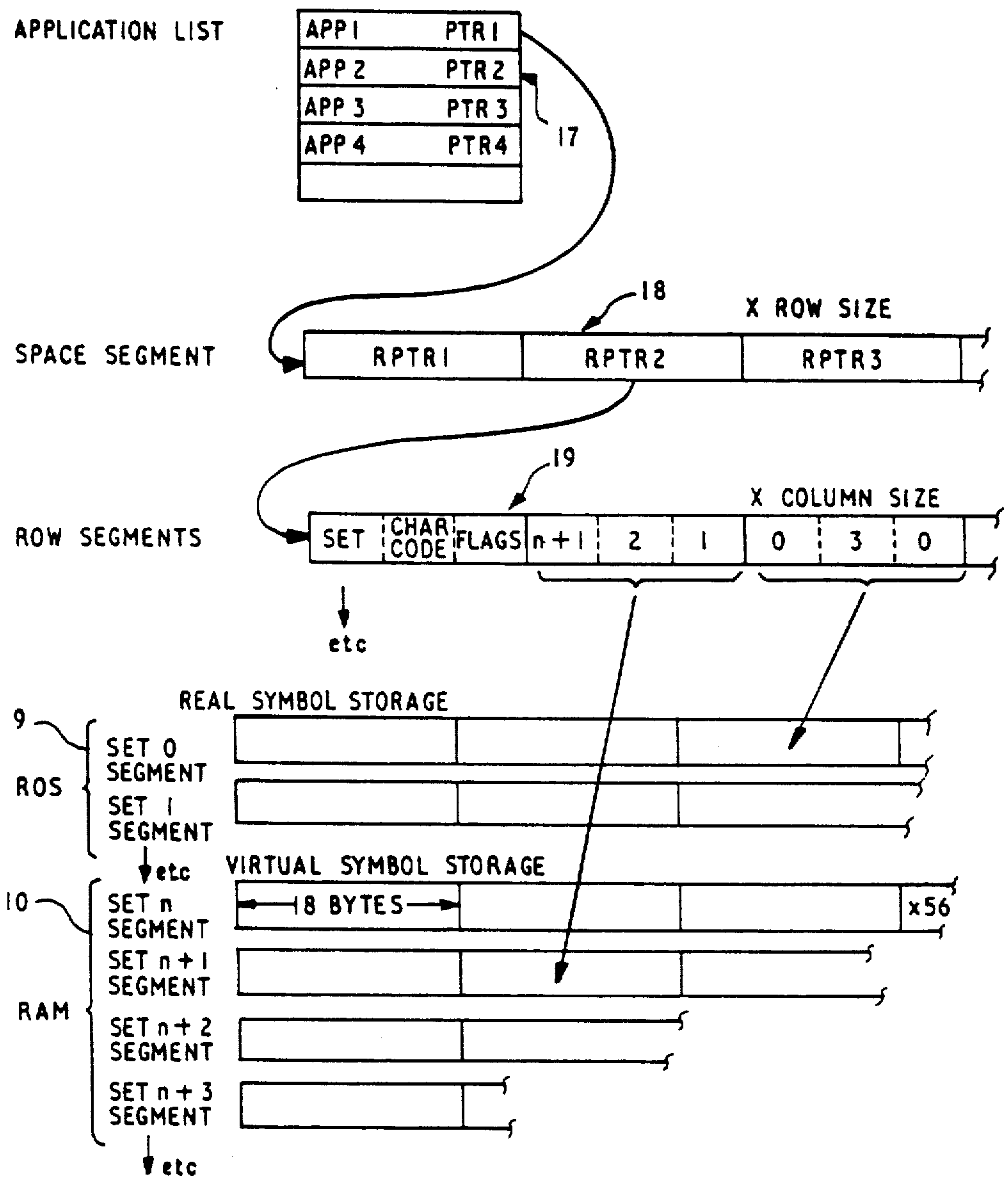
FIG. 3 shows presentation space storage allocation and virtual symbol storage allocation on the virtual memory terminal.

Referring to FIG. 1 and FIG. 3 presentation space entries can point either to the read-only section 9 of the character generator 8 or to the read/write virtual symbol storage 10. The most commonly used symbols such as alphanumerics are permanently held as character cells in ROS 9 and the less common symbols such as portions of lines generated by the application are loaded as graphics cells into virtual symbol storage 10 as and when they are generated by presentation interface services. In practice, the 8775 hardware on which VMT is modelled has eight sets of real symbol storage in which characters or symbols are either permanently held or into which they may be loaded. Each set can contain 192 cells. Two sets 0, 1 are used only in read-only mode and permanently hold the standard symbols such as alpha numerics, and those graphics symbols most commonly used such as horizontal and vertical straight line segments.

A previously allocated entry in a presentation space row is converted from referencing a ROS symbol storage cell to referencing a RAM virtual symbol storage cell is pel addressed data is overlayed onto cell addressed data. To prevent loss of data in this instance, the original ROS cell contents are copied to RAM virtual symbol storage. When cell addressed data is overlayed onto pel addressed data then the content of the newly requested ROS cell is OR-ed into the previously allocated RAM virtual symbol storage cell.

Allocation of presentation space in VMT will now be described with reference to FIG. 3 of the drawings. Following a user request for a selected application, a pointer PTR 1 (say) associated with the selected application 1 (say) is loaded as a list header in a location of VMT RAM specifically set aside for the purpose. As each additional application is called, so different identifying pointers (PTR 1, PTR 2, PTR 3 . . . ) are allocated and added to the application list 17. Presentation space within VMT storage is allocated by the VMT store manager a row at a time as it is required. Thus the header pointer PTR 1 (say) for an application points to an associated space segment 18 containing further pointers to the actaul rows allocated within the RAM and constituting the presentation space for the application. These row pointers RPTR1, RPTR2, RPTR3 . . . are assigned as each row is required. Accordingly, the space segment (or segments if more than one is needed) contain as many row pointers as there are rows of presentation space required by the application, which number can greatly exceed the number of rows available on the screen for display.

Each row pointer RPTR1, RPTR2 . . . points in turn to a second level row segment 19 of the presentation space each of which contains a reference to the actual cells allocated for that row. Each column field in the row referencing a cell three sub fields and selects: (1) a cell set; (2) a character code within the set, and (3) a flag field.

The symbol storage cell segments contain the actual 9×16 bit patterns for display on the screen and fall into the two categories namely ROS or RAM referred to hereinbefore. Set 0 segment and Set 1 segment hold the permanently written ROS cells (shown schematically as block 9 in FIG. 1). Only two ROS segments are shown in FIG. 3 although of course more may be provided if required. The remaining cells containing bit patterns generated by the application using for example Bresenham algorithms are loaded as they are generated into a number of further segments identified as Set n segment to Set n+3 segment in the figure in the virtual random access storage of VMT (shown schematically as block 10 in FIG. 1). Thus the entry for each column field in a row segment contains the identification (set segment number and character code) of the character or symbol of presentation space data associated with that row and column position.

The character code identifier specifies a symbol storage cell number in the selected symbol storage set. The flag byte indicates whether the symbol storage cell referenced by the column entry is in real storage 9 or in virtual symbol storage 10.

Thus in the figure, row pointer RPTR 2 points to its row segment in RAM which in turn points to the appropriate symbol storage cells in that row. From the figure it is seen that the second column entry of row segment 19 points to the 2nd cell within the Set n+1 segment 19 and the fact that this is virtual symbol storage is indicated by the flag byte being set to binary '1'. The third column entry of row segment 19 points to the 3rd cell within the Set 0 segment and the fact that this is read symbol storage is indicated by the flag byte being set to binary '0'. Each presentation space cell is 18 bytes long and there are 56 cells in a set in the present embodiment.

The benefit of this presentation space structure is in the storage economy that can result from only allocating presentation space row and bit storage to the occupied areas of a presentation space. A request for a new presentation space allocates a space segment which is initialized with all its row pointer fields set to null. Row segments are allocated when data is to be entered into them to ensure that row storage is allocated only where it is required. When a row segment is allocated its column entries are set to null. Thus the allocation of a row segment to a presentation space does not allocate image storage for the row. Data entry into a presentation space which is in pel addressed mode causes cells to be allocated from the 56 byte RAM virtual symbol storage cell sets to the column positions in row segments which are to contain data. This ensures that the image storage is only allocated in the column positions where it is required. On demand allocation of the virtual symbol storage cells ensures that a maxiumum of one virtual symbol storage cell set remains unallocated at any time.

Due to the large capacity backing store available on VMT the overcommitment of terminal storage by large or non-sparse presentation spaces does not result in termination of applications or inhibit the generation of additional presentation spaces. Overcommitment of terminal storage may cause presentation space access degradation due to paging and thus affect application execution performance or operator function response. If the terminal store is of adequate size to hold the presentation spaces which the operator or applications require to access concurrently, then paging will occur only when the working set changes as a result of viewport reselection or activation of a different application.

A CLEAR presentation space facility invoked by the presentation space services retains the space segment for the presentation space and reinitializes its referenced row segment pointer fields to null. The previously allocated row segments are freed and the virtual symbol storage cells referenced from the row segments are cleared. Thus the storage space previously allocated to the presentation space is made available for re-use.

A DELETE presentation space facility invoked by the presentation space services is similar to a CLEAR presentation space with the addition that the space segment is also freed. A presentation space is not deleted while it is still accessed by viewports.

This completes the description of the allocation of presentation space for the application data. The specific techniques involved for allocating virtual memory space for the data under program control are themselves not new being the same as those used in VMT or other known storage management systems.

VIEWPORTING FACILITIES

The screen manager includes a viewport management program which is used to develop the viewport operations provided to a user of VMT in order to view multiple presentation spaces. The viewport operations provided to the terminal operator include DEFINE, RESELECT, MOVE, REDIMENSION and DELETE. These operations largely involve standard techniques such as described in the aforesaid standard works of reference "Fundamentals of Computer Graphics" by Foley and Van Damn and "Principles of Interactive Computer Graphics" by Newman and Sproull. Since these techniques for defining and transforming viewports on a screen are extremely well known and understood by persons skilled in this particular art and because a detailed understanding of the techniques is not required in order to understand and appreciate the present invention, details will not be given herein. Instead, a summary of the viewport operations are given with those features and details which have been specifically selected or devised for this particular implementation on VMT explained.

VMT viewports are specified by their top right and bottom left screen pel coordiantes however their usable area is limited to the integral cells contained within the specified rectangular areas. Viewport coordinate definition is performed using a graphics cursor which is provided by the presentation interface. Any one of a number of specified viewports can be selected as the current viewport and will be the one which will be brought to the foreground by being redrawn to overlay any other viewports. Only the current viewport displays a cursor or is scrollable.

Each presentation space must have one, and may have many, viewports allocated to it as is shown in some of the examples in FIG. 2. Each viewport is given a unique serial number and a permanent logical link is established with the presentation space from which its formatted display data comes. In this implementation a viewport cannot be reassigned to an alternative presentation space. If the application executing is the one being viewed through the current viewport then all presentation space updates are viewable as they happen. All viewable fragments of overlayed viewports must be updated directly their underlying presentation spaces are modified. The number of viewports which can be synchronously updated is dependent on the size of the viewport identification field that is assigned to the screen buffer.

When a new viewport is requested, in this case by a DEFINE operation, it is initialized to cell addressed mode. That is, the alignment of the presentation space to the viewport is initialized so that the top left of the presentation space registers with the viewport top left and an alphanumeric cursor is displayed in the viewport top left. The pel addressed mode parameters for a new viewport are initialized so that when this mode is first selected the presentation space bottom left will register in the viewport bottom left and the graphics cursor will display in the viewport bottom left. A newly requested viewport is automatically initialized as the current viewport. If a requested viewport dimension exceeds the corresponding dimension of the underlying presentation space then the viewport dimension is automatically truncated to match the presentation space dimension. In this event the top left view port coordinate is retained as requested.

The current viewport can be scrolled over the presentation space by cell increments. Attempts to scroll to positions where a presentation space boundary would like within the viewport boundary inhibited. A typamatic scrolling over both cell and pel based presentation spaces has been achieved.

Each viewport is allocated its own unique alphanumeric and graphic cursors. A selection of cursors are shown in the viewports in FIG. 2. These can be independently moved over their associated viewport and used for alphanumeric and graphics entry to the underlying presentation space. Data can be entered into a presentation space from any viewports associated with it. The current viewport can be toggled between the cell and pel addressed mode. In cell addressed mode the alphanumeric cursor is displayed, in pel addressed mode the graphic cursor is displayed. The registration of the cursors to the presentation space is preserved between modes allowing the previous data entry status in either mode to be reselected. The graphic cursor shape for each viewport is selectable by the terminal operator to aid viewport identification. Full clipping of graphics cursors occur when a cursor encounters its viewport boundary. The relative position of cursors with respect to the displayed presentation space is retained during scrolling. If a cursor would leave the viewport as a result of the scrolling action then its X and Y presentation space address is modified to keep it within the viewport.

The current viewport can be repositioned to any position on the screen using the MOVE operation. The registration of the viewport to the presentation space and the registration of the presentation space to the current cursor position are retained unaltered by this move. The repositioning operation can be executed with or without viewport redimensioning. When a REDIMENSION operation is used the registration of the presentation space to the viewport is reinitialized as for a new viewport (i.e. top left to top left for the cell address parameters, bottom left to bottom left for the pel address parameters). It has been found necessary to reinitialize the alignment of the presentation space to the viewport during viewport redimensioning due to the possibility that the new viewport dimensions are incompatible with the current presentation space scroll position. The currently selected addressing mode for the viewport is unaltered by redimensioning.

A viewport RESELECT operation deselects the current viewport and installs the requested viewport as the current viewport. Viewport reselection automatically recreates the total viewport status and data content prior to deselection plus any changes which have occurred in the viewable content of the presentation space since deselection but were previously overlayed. The current is redisplayed in a reselected viewport at its position prior to deselection or, if data entry to the underlying presentation space had taken place while deselected, at the next data entry point.

The DELETE viewport facility reselects the viewport to be deleted as the current viewport then deletes the current viewport and leaves the screen without a current viewport. It then invites the oeprator to select the next current viewport. A presentation space is not allowed to exist without having a viewport to reference it. When the last viewport referencing a presentation space is deleted then the presentation space which it references is also deleted.

The deletion of the current viewport and its contents clears the current viewport screen area and thus often provides an opportunity to extend previously overlayed viewport fragments. To take advantage of this situation it is necessary for the operator to reselect the viewports to be extended unless a sequential history of selection is retained which would allow this to occurr automatically.

VIEWPORTING IMPLEMENTATION

The presentation interface viewport instructions are implemented mostly in low level code and perform the screen functions necessary to support the viewport manipulation operations required by the viewport management program. These instructions are used by the viewport management code to provide the viewport specification and manipulation functions required by the terminal operator to view presentation spaces.

Cursor vectors drawn by the presentation interface are clipped at the viewport boundaries and graphic cursors are consequentially not visible outside the current viewport. As it is desirable to set viewport coordinates interactively using the system graphics cursor an ERASE-CURRENT-VIEWPORT instruction is provided to give the system graphic cursor full screen access for this purpose. This instruction sets the screen mode so that full screen access is available to the system cursor which is then used for defining viewport coordinates.

The top left and bottom right coordinate for the single current viewport are held below the presentation interface level using a SET-CURRENT-VIEWPORT instruction. This level of the interface provides facilities for drawing the current viewport from the coordinates (DRAW-CURRENT-VIEWPORT), in a chosen line style, such that the viewport is the enclosed area specified by a rectangle constructed from the coordinates.

The inverse of the viewport can be selected to make the area between the screen edge and the rectangle described by the current viewport coordinates into the current viewport (INVERT-CURRENT-VIEWPORT). This is used when viewporting the screen without the use of the presentation space facility and gives the ability to specify a viewport on the screen and select for update inside or outside the viewport. The application must provide any functions which are required for manipulating screen data in this presentation interface environment.

The CLEAR-CURRENT-VIEWPORT instruction will reset the contents of the current viewport. When displaying from a presentation space it is used by the presentation space management code after a presentation space RESET.

Viewporting on VMT may be performed in either of two ways. In the first method and the simplest, viewporting is achieved by flagging the cells which do not comprise the required viewport. This method is implemented by drawing the left and right boundary vectors of the intended viewport, in the chosen line style for the viewport boundary, and flagging the cells visited. A conventional fill algorithm is then used to fill all the cells outside the viewport. The top and bottom viewport boundary vectors are then drawn.

Figure 4A:
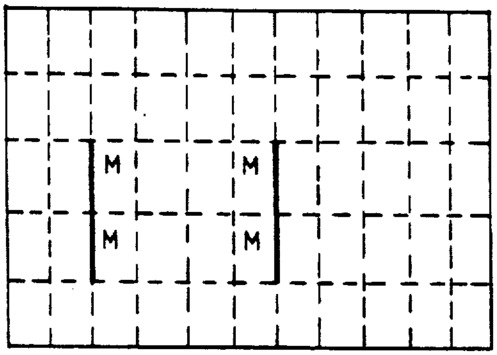
FIGS. 4*a*, 4*b* and 4*c* shows the procedure for the definition of a current viewport.
Figure 4B:
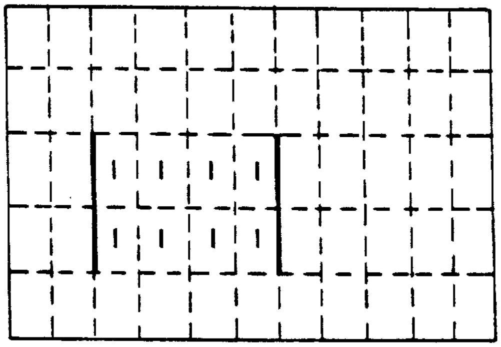

The second, extended and modified method enables multiple active viewports to be implemented. To do this, viewport cells themselves rather than inverse viewport cells are flagged with a viewport identification serial number as shown in FIG. 4 of the drawings. The steps performed in response to a DEFINE CURRENT VIEWPORT instruction are as follows:

1. Draw the viewport left and right boundary and mark the cells which are used. In the example shown in FIG. 4A, the visited cells are marked M.

2. Flag all cells inside the viewport with the application identification serial number. In the example shown in FIG. 4B, the cells within the boundaries are filled with a flag 1.

Figure 4C:
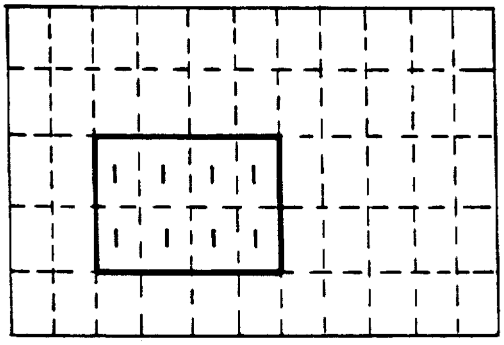

3. Draw the top and bottom of the viewport. The completed viewport is shown in FIG. 4C.

Figure 5:
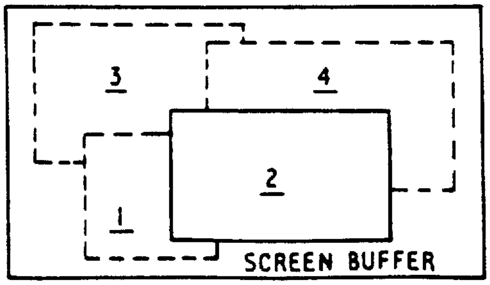
FIG. 5 shows the flagging technique used for overlapping viewports.

The flags associated with a number of overlapping viewports are shown in FIG. 5. A new current viewport such as the viewport unit flag 2 will overlay previously flagged cells with its own identifying flags. This method allows the successive overlay of different current viewports while retaining the correct identifiers within the viewports or the fragments of viewports which remain visible on the periphery of the current viewport.

This modified viewport identification method allows multiple active overlapped viewports to be synchronously updated and ensures that clipping viewports, or viewport fragment, boundaries is executed correctly when viewport overlay has generated fragmentated viewports.

Following viewport identification of a window on an associated presentation space, access by means of the two level tree structures of space and row segments is made to the relevant presentation space entries—that is those space entries within the specified window (identified by inspection of the corresponding viewport flags). Each presentation space entry points either to a presentation space cell in real ROS 9 where the conventional characters such as alpha-numerics are permanently held or to a presentation space cell in virtual storage 10 where the less frequently used symbols such as those generated to represent graphics for example are stored as and when they are generated. Where, as in the latter case, a presentation space window entry references a virtual presentation space cell, then a RAM cell in real RAM storage 11 is allocated and the pel pattern from the virtual presentation space cell copied to the RAM presentation space cell. By this means, all the pel patterns of all the cells required for display in a selected viewport on the screen are available in the real storage 8 of the VMT for direct access by the refresh mechanism as the real refresh buffer is sequentially read.

Should the operator requirements result in one viewport partially overlaying another as shown on the screen 13 of FIG. 1 or FIG. 5, then some means must also be provided to indicate the priorities of the viewports on the screen and to enable redisplay of any underlaying viewport when the overlayed viewport is deleted, moved or redimensioned. Accordingly, a Viewport Order List is used to retain the order in which viewports have been selected by the operator. This list is updated each time a new current viewport is selected such that it only contains one entry per viewport. This involves deleting the list entry for a reselected viewport, compressing the list to suppress blanks and adding the identity of the reselected viewport to the head of the list.

As well as the addition of the Viewport Order List there is need to modify the mechanisms for defining viewports described above. In the preferred method, the DEFINE Viewport operation operates by defining the left and right boundary cells of the viewport then performing a fill operation to write the flag fields for the cells contained in the viewport with the flag value allocated for that viewport. The modified marking operation is done by a separate marker bit per cell which is additional to, and independent, of the flag field. Writing the flag fields for the cells contained inthe viewport is performed by a fill operation based on filling the flag fields for the cells which lie between marker pairs. During the fill scan each marked viewport boundary cell encountered has its flag field loaded and its marker turned off.

A further change involves reserving one of the values in the flag field (e.g. '99') for use by the screen manager.

Figure 6A:
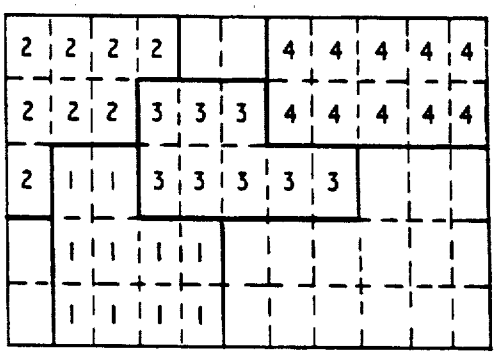
FIGS. 6A, 6B, 6C, 6D, 6E and 6F show the procedure for deleting a viewport from a screen of overlapping viewports.

The initial action on the screen is identical for DELETE, MOVE and REDIMENSION viewport and accordingly the following description will reference the case for DELETE viewport as one example. This is illustrated with reference to FIG. 6 which shows the step by step sequence of operations for the deletion of viewport (marked with flags 3) partially overlaying two viewports 1 and 2 (marked with flags 1 and 2 respectively) and itself partially overlaid by a fourth viewport 4 (marked with flags 4). This initial state of the viewports is shown in FIG. 6*a*. The Viewport Order List is accessed to determine which of the viewports are candidates for redisplay. Only viewports less recently selected than the one to be deleted need be considered for redisplay. The subgroup of viewports less recently selected than the one being modified are selectively redisplayed starting with the most recently selected of this subgroup. The transfer from the presentation space to the viewport is also selective in that only the cells within the subgroup viewport which contain the flag number for the viewport to be deleted need to be redisplayed. Once redisplayed such cells are reflagged to the correct subgroup viewport. This mechanism will allow correct redisplay even when the viewport boundaries are complex shapes. By starting the update on the most recently selected viewport the correct precedence of overlay from the original selection order is preserved.

These objectives are achieved using the marker field and the reserved value in the falg field with the following sequence.

Figure 6B:
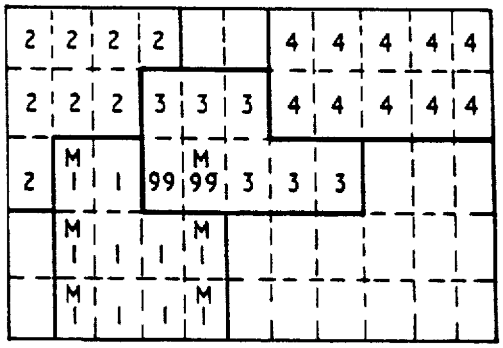

1. Re-mark the left and right boundaries of the viewport to be redisplayed as described above for DEFINE viewport. In FIG. 6B viewport 1 boundaries are marked M.

2. Re-execute the flag fill sequence for the marked viewport but in this instance change the flag value for the cells, within the marked viewport which contain the flag value for the DELETE viewport, to the reserved value ('99'). This uniquely identifies the cells within the viewport which have to be redisplayed from the Presentation Space. In FIG. 6B, two cells of viewport 1 overlaid by cells of viewport 3 to be deleted are so marked.

Figure 6C:
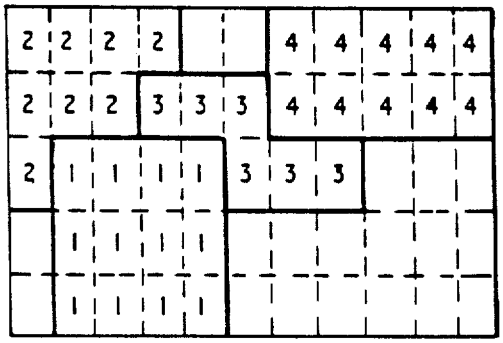
Figure 6D:
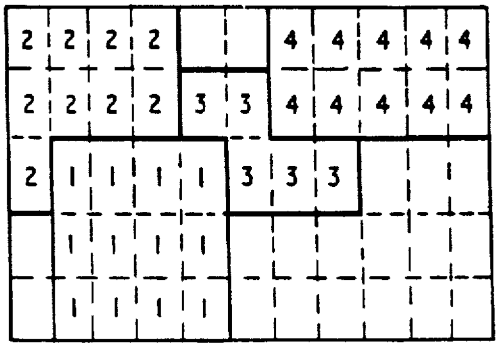
Figure 6E:
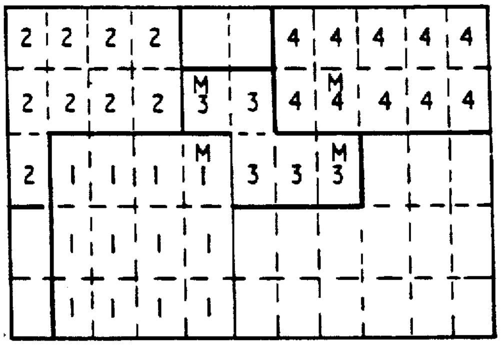

3. As each cell which is marked with the reserved value ('99') is redisplayed from the Presentation Space its flag field is changed to that for the viewport being redisplayed. In FIG. 6C the two reserved value flag fields ('99') of viewport 1 are changed to flag 1. This sequence of steps is repreated for the remaining viewports on the sub-group. FIG. 6D shows the situation after the sequence has been repeated for viewport 2. When all the 'redisplay subgroup' viewports have been redisplayed any remaining flags for the deleted viewport are reset. This final step in delete viewport is achieved by:

1. Re-mark the left and right boundaries of the viewport to be erased as described above the DEFINE viewport. During this operation any cells having the erase viewport flag value will have the viewport boundary vector (if any) erased. FIG. 6E shows the boundaries for viewport 3 marked.

Figure 6F:
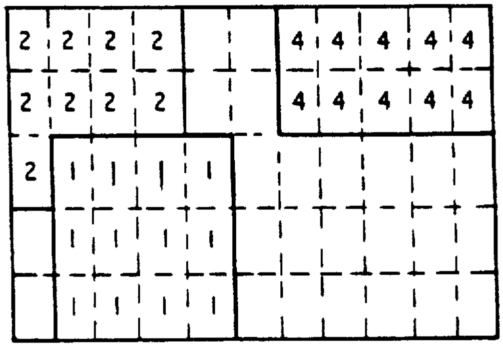

2. Re-execute the flag fill sequence for the marked viewport but in this instance reset the flag value for the cells, within the marked viewport, which contain the flag value for the delete viewport. FIG. 6F shows the situation at the end of the procedure with viewport 3 erased from the screen.

At this point the DELETE viewport operation terminates. A MOVE or REDIMENSION viewport may complete by selecting the viewport as the current viewport and executing DEFINE viewport for the new viewport coordinates.

SCROLLING

Scrolling a viewport over a presentation space can be achieved in one of two ways on the VMT and the procedure is illustrated in FIG. 7 of the drawings.

Figure 7A:
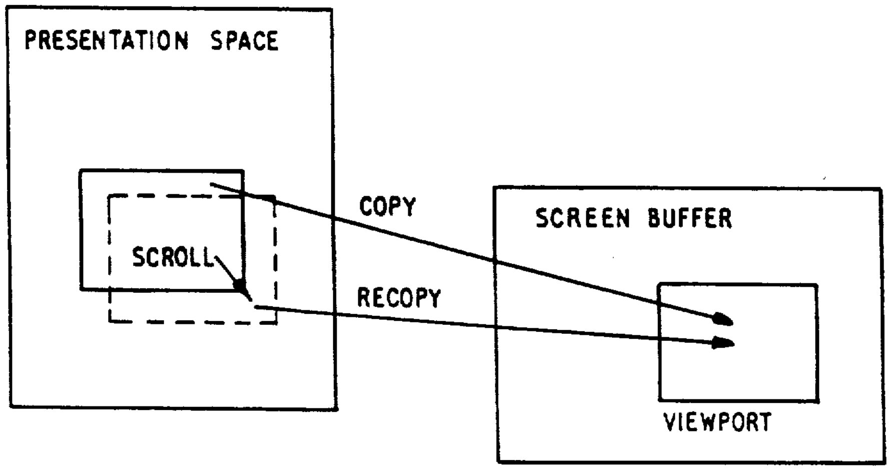
FIGS. 7*a* and 7*b* show two scrolling implementation options.
Figure 7B:
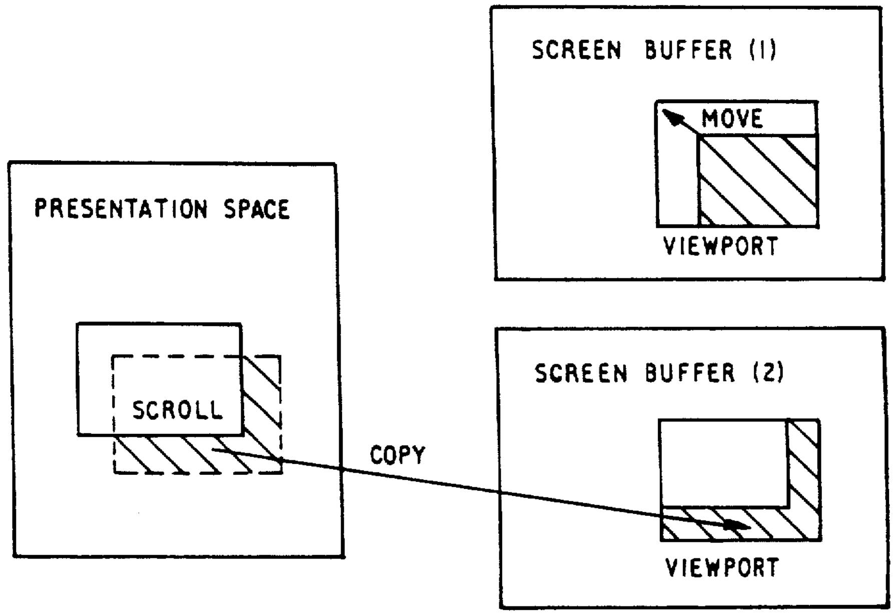

For each activation of SCROLL, the newly selected area of the presentation space can be copied to the viewport as shown in FIG. 7A. This is a time consuming operation, inefficient in use of storage space. Alternatively, as the viewport already contains most of the data required for a new scroll position, viewport to viewport moves can be executed. However data not currently in the screen buffer (data on the periphery of the viewport) must still be supplied from the presentation space as shown in FIG. 7B. Since the terminal is implemented with a level of indirection in the screen buffer where the buffer accessed ROS and RAM real symbol storage cells this enables a major enhancement to be made in the performance of the second method as much of the scrolling function can then be achieved by moving pointers that is, cell references in the refresh buffer, and not bit images.

Figure 8:
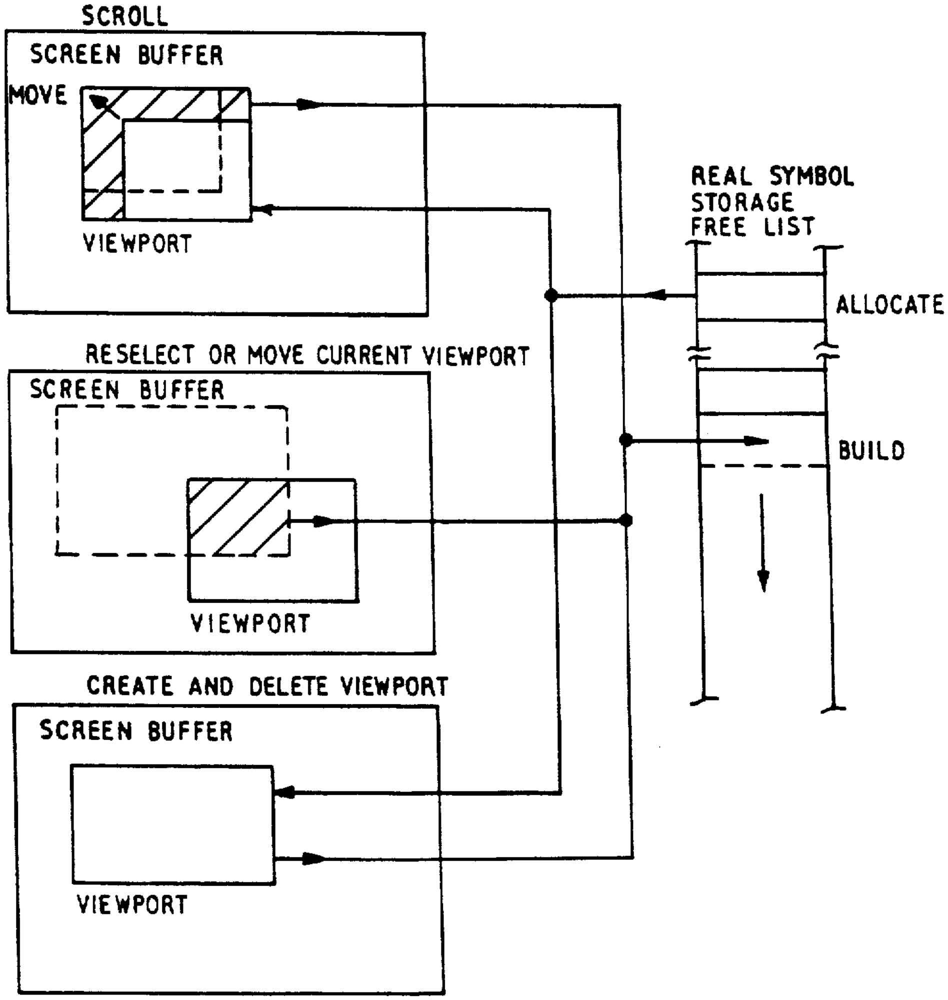
FIG. 8 illustrates the technique for symbol storage free list allocation and build.

Accordingly, each scroll step makes free a row or column of cells on one edge of the viewport and then allocates a row or column of cells on the opposite edge of the viewport and fills them from the presentation space. This operation indicates the requirement for a flexible RAM real symbol storage allocation and recovery scheme when viewporting on a symbol storage based display. For this reason the VMT presentation interface uses a RAM real symbol storage free list and a cell recovery mechanism for cells which become available for reuse. This is described with reference to FIG. 8 which shows the real symbol storage free list allocation and build. Cells which become invisible during scrolling are returned to this free list as are cells which are made available when a part of a viewport is deleted, and cells which are made available when a part of a viewport is overlayed as the result of changing the current viewport through viewport reselection. The free list is used to supply the needs of the screen when new cells which become visible are required during scrolling or when a new viewport is defined or a viewport is reselected. The RAM real symbol storage free list mechanism is totally synchronous as all recovery and reallocation is performed in line with the operations which free or require RAM real symbol storage.

The use of a RAM real symbol storage free list ensures that the maximum amount of RAM real symbol storage required for the worst case screen usage is that required to give 100% screen occupancy. In practice substantially less than 100% is usually adequate because screen occupancy is rarely 100% and the use of ROS symbol storage dilutes the requirement.

A cell addressed column entry in a presentation space row segment reference a ROS symbol storage cell. The ROS symbol storage can also be referenced as symbol storage by the terminal screen refresh buffer. Scrolling over a totally cell addressed presentation space involves copying the ROS symbol storage code references to the screen refresh buffer for interpretation and display by the terminal hardware. A column entry in a presentation space row segment may reference a RAM symbol storage cell. Scrolling over a presentation space containing pel addressed data involves allocating RAM real symbol storage for new data which is to be displayed in the viewport. The content of the RAM virtual symbol storage cell to be displayed is copied to a newly allocated RAM real symbol storage cell and a reference to the new RAM real symbol storage cell is inserted into the screen buffer. Scrolling a predominantly cell addressed presentation space is therefore intrinsically faster than scrolling a predominantly pel addressed presentation space. In practice the difference is small, if there is indirection (via symbol sotrage) in the refresh buffer, as most of the scrolling sub-steps for both types of presentation space are pointer moves for data already displayed in the viewport.

PRESENTATION ON SPACE AND VIEWPORT STATUS

Figure 9:
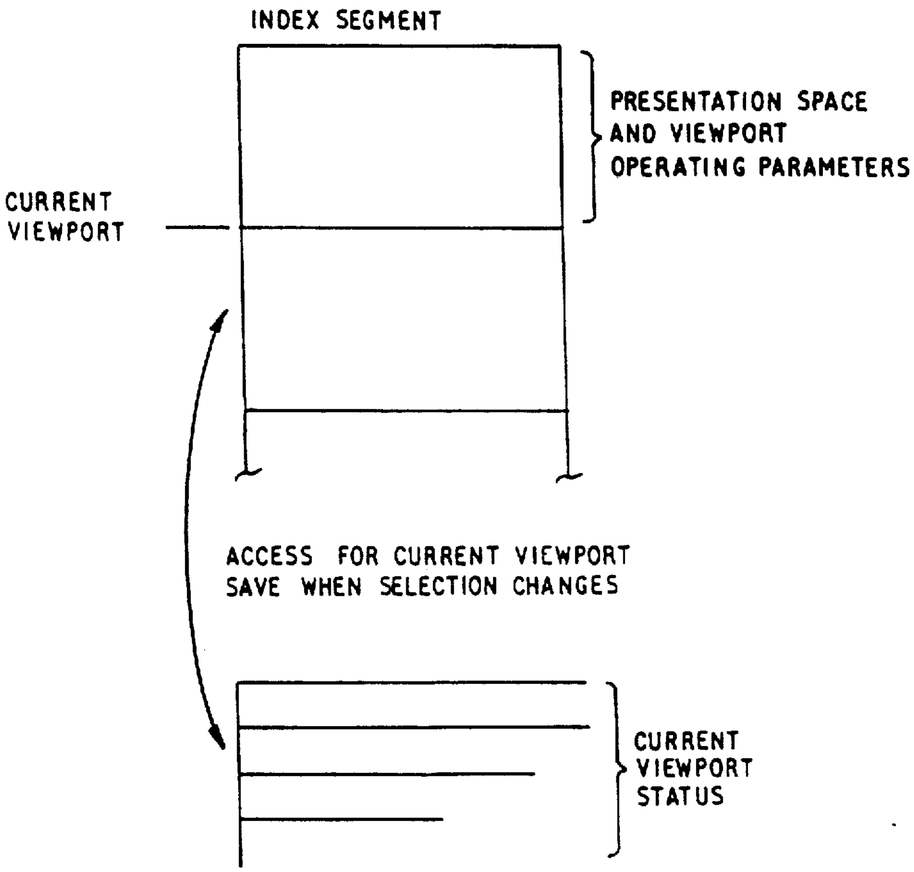
FIG. 9 illustrates the use of presentation space index segments.

It is necessary to retain the definitions (width, depth, type) for all the currently active presentation spaces and viewports. Also, in order to reference the screen position of the viewport and the cursor to the presentation space it is necessary to have coordinate references which are retained for each presentation space and viewport and are modified as scrolling, cursor movement and data entry proceed. When a different viewport is selected these coordinates are saved and reaccessed on reselection. This status data is held in Space Index Segments which catalog all the operating parameters for the currently specified presentation spaces and viewports. This procedure is described with reference to FIG. 9.

The Space Index Segment contains an entry for each viewport defined by the operator. As each Presentation Space must have at least one Viewport it also, therefore, contains the Presentation Space parameters for the interface. Each entry in the Space Index Segment contains the total status for one Viewport, namely:

Space Pointer, to allow the correct Presentation Space to be referenced when the viewport is selected.

Viewport Lock, to allow the accessing of the associated Presentation Space through the Viewport to be inhibited.

Viewport Mode, to allow the cell or pel addressed mode, as selected when last updated or viewed, to be reinstalled on reselection.

Pel X and Y dimensions of the Presentation Space.

Cell X and Y dimensions of the Presentation Space.

Viewport width and depth.

Viewport top left and bottom right X, Y addresses.

Graphic and character cursor X, Y coordinates.

Presentation Space X, Y coordinates in character and graphics mode.

The first viewport is allocated to the system to hold statistics of screen usage.

In addition to the Space Index Segment a Viewport Allocation Counter provides the Viewport serial number for the next Viewport to be allocated and also defines the number of entries present in the Space Index Segment.

When the operator requests an additional Viewport to reference a Presentation Space the Presentation Space parameters are repeated in the Space Index Segment entry for the new Viewport. When a Viewport is deleted the Viewport Lock for that entry in the Space Index Segment is set. When the last Viewport referencing a Presentation Space is deleted then the referenced Presentation Space is also deleted and the storage which the Presentation Space occupies is freed. The use of the Viewport Lock and the absence of reuse of Space Index Segment entries for Viewports which have been deleted ensures that the initially allocated Viewport number can always be used to index into the Space Index segment.

Figure 10:
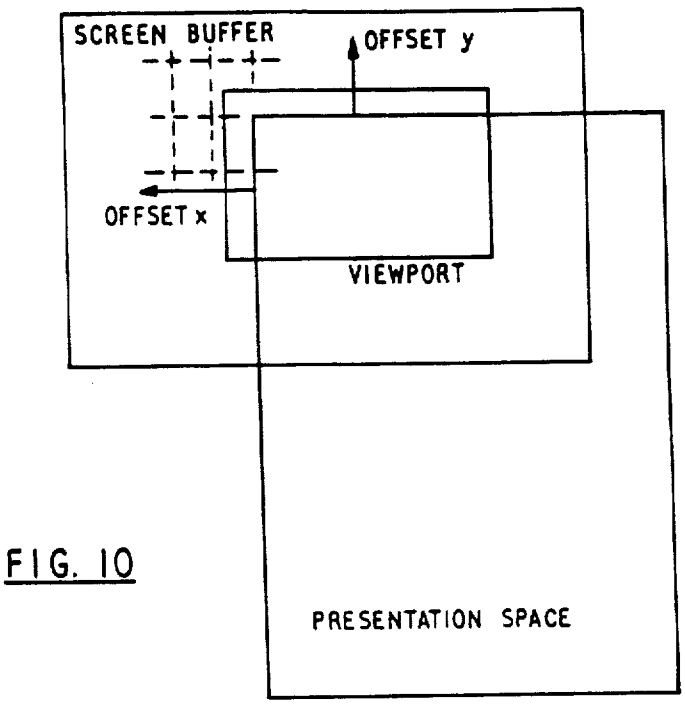
FIG. 10 illustrates presentation space tracking with cell data.

The part of the presentation space which is displayed in the viewport is dependent on the alignment of the viewport within the presentation space. The initial alignment for a cell addressed presentation space is shown in FIG. 10. When the alignment of the presentation space with respect to the viewport is changed by scrolling so that values of Offset X and Y are modified accordingly. The offset values together with the viewport dimensions are used to select the presentation space data which is copied to the viewport.

Figure 11:
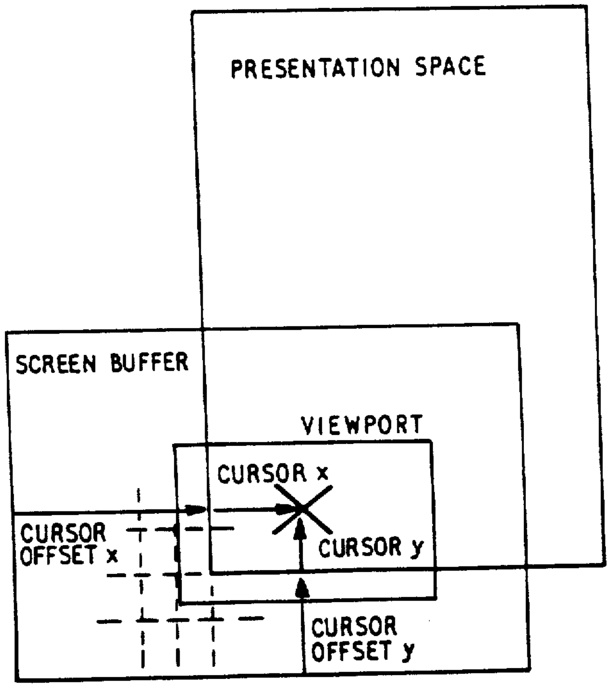
FIG. 11 illustrates presentation space tracking with pel addressed data and cursor tracking.

Alpha-numeric and graphics cursors are drawn directly to the screen buffer using the low level cursor cells in presentation interface user set. It is necessary to retain tracking parameters for them as the physical screen cursor positions are defined from the screen boundary but the logical cursor positions are relative to the presentation space origin. The positioning parameters for a pel addressed presentation space are shown in FIG. 11. Cursor Offset X and Y parameters track the scroll position of the presentation space with respect to the screen edge while Cursor X and Y track the positioning of the cursor in the presentation space. The cursor is drawn at the screen position derived from Cursor Offset X+ Cursor X and Cursor Offset Y+ Cursor Y.

VIRTUAL SYMBOL STORAGE CELL SET REUSE

The use of the viewporting facilities will generate undisplayed RAM real symbol storage cells which are, as previously described, recycled via the RAM PS free list.

Figure 12:
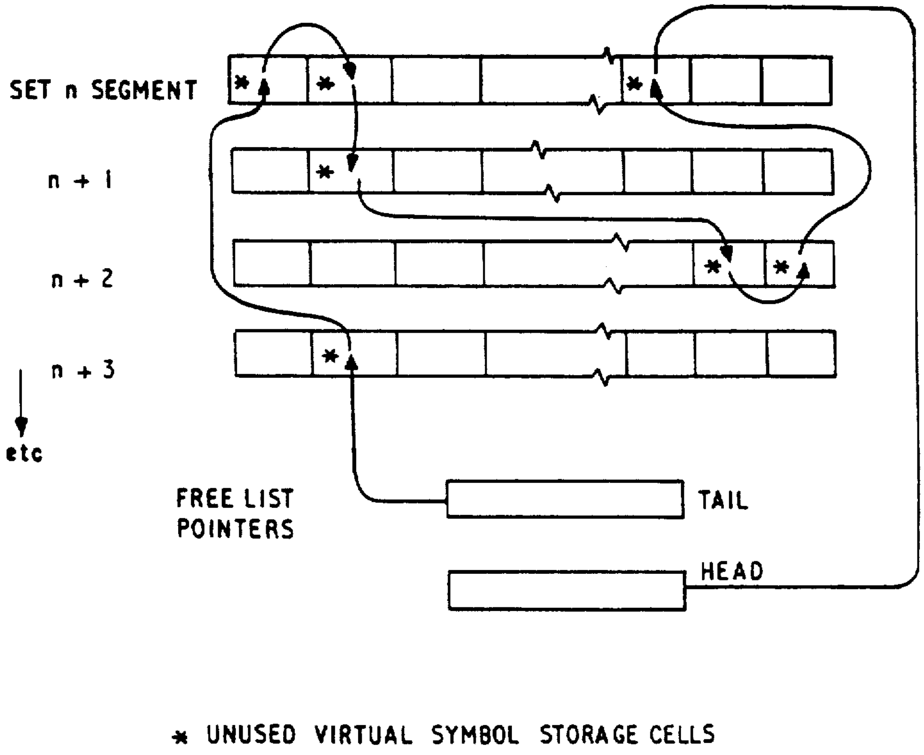
FIG. 12 illustrates the technique used for symbol storage cell recovery.

In a similar way virtual symbol storage cells can also become unused as a result of interaction with, or deletion of, pel addressed presentation spaces. The distribution of virtual symbol storage cells within the sets is variable, depending on the access patterns which applications make to their presentation spaces. Thus over a period virtual symbol storage cell sets may become partially or totally unused resulting in raster space in the VMT store. Low priority garbage collection allows unused cells to be offered to reuse via a presentation space cell free list. The list is linked by chain pointers which are inserted into the spare cells in FIG. 12.

What is claimed is:

1. A method to be practiced in an interactive display system for displaying on a raster-scanned or matrix address display device of a terminal, selected windows of data supplied to or generated by the system in the course of performance of one or more applications invoked by the user of the terminal, said data being supplied or generated in the form of coded information (text, image, or vector orders) and said system comprising formatting means for expanding selected parts of the coded information into full non-coded image representation of the data, means for storing bit image representation of said selected windows of data in a refresh buffer, and means for sampling the contents of said refresh buffer in synchronism with the scan of said display device in order to display the selected data portions mapped in said refresh buffer in corresponding viewports on the display device, said method being characterized in that said terminal is provided with storage space for on-demand storage and retrieval of bit image representations of all the data formatted by the application or applications invoked by the user whether or not such bit image representations are or will be displayed, presentation interface means is provided and rendered operable in response to such user invocation of an application to allocate presentation space within said storage and to store all formatted data associated with said application therein, and screen manager means is provided and rendered responsive to user input to identify and map the contents of those presentation spaces containing the image representation of said selected windows of data into said refresh buffer.

2. A method as claimed in claim 1, wherein the display device is adapted to display a picture formed as a plurality of character and/or symbol cells, said refresh buffer being adapted to contain a number of pointers, one of each character or symbol cell position on the display device, and said display device includes a character/symbol generator adapted to contain bit patterns representing characters and/or symbols to be displayed, and wherein said method if further characterized in that said generator is organized into two sections, a first read-only section containing bit patterns representing characters and/or symbols most likely to experience multiple access for display, and a read/write section adapted to receive and store bit patterns representing characters and/or symbols not already contained in the read-only section, said screen manager being adapted during use to load said refresh buffer with pointers (determined by the content of the picture to be displayed) to the corresponding character and/or symbol cell in the read-only section of said generator, to load said read/write section with bit patterns representing the remaining required cells for display, and to load the refresh buffer with pointers to the appropriate cells in the read/write section accordingly.

3. A method as claimed in claim 2, in which each representation space is structured as a two level tree where a first level space segment associated with an application contains pointers to individual row segments of the space and each row segment contains references to character or symbol cells allocated for that row.

4. A method as claimed in claim 3, in which, for characters and/or symbols contained in said read-only section of said generator, said row segments refer direct to the appropriate cell within the read-only section for subsequent access of characters and/or symbols contained therein, but refer to allocated regions of storage into which the remaining character and/or symbol cells are written as they are encountered during formatting of the application data into its allocated presentation space.

5. A method as claimed in claim 4, in which, said screen manager copies the row segment references to read-only cells in the generator direct to positions within the refresh buffer defined by the position of the corresponding viewport on the screen, allocates cells within the read/write section of the generator for each bit pattern of said remaining characters and/or syumbols within a window, copies said bit patterns to the allocated read/write cells, and converts the references to character and/or symbol cells in allocated storage of said remaining characters and/or symbols within the window to reference to the corresponding read/write cells in the generator.

6. A method as claimed in claim 5, in which predominantly character cells are held in the read-only section of the generator and predominantly graphics cells, generated as required by the application, held in dynamically allocated storage, are copied in the read/write section of the generator for access by the refresh buffer whenever a row segment referring to that cell is included in a window for display.

7. A method as claimed in claim 6, in which character cells are addressed at the top left hand of the cell and display of viewports on character data is initialized at the top left hand corner of the cell and display of viewports on character data is initialized at the top left hand corner of the associated presentation space data.

8. A method as claimed in claim 7, in which graphics cells are addressed at the bottom left hand corner of the cell and display of viewports on graphics data is initialized at the bottom left hand corner of the associated presentation space data.

9. A method as claimed in claim 8, in which said screen manager in response to user input specifying viewport dimensions on the screen determines the location of, and marks cells corresponding to, the left and right boundaries of the viewport on the associated presentation data and thereafter further marks with flags, by means of an area fill algorithm and with reference to the boundary flags, all the cells in the refresh buffer lying between the left and right boundaries.

10. A method as claimed in claim 9, in which the area fill flags within the refresh buffer differ are from one viewport to another so as to provide unique identification of the viewport with which they are associated.

11. A method as claimed in claim 10, including a viewport order list to which a viewport identifier is added each time a new viewport is generated, said list providing an indication of the screen manager of the sequence in which viewport display occurred and identifies the current viewport.

12. A method as claimed in claim 11, in which data in the current viewport is displayed inpreference to data in viewports it overlays, the arrangement being such in the event of movement or deletion of the current viewport, the screen manager program executes a procedure for redisplaying the overlaid data in underlying viewports including the following steps:

(1) redefine the left and right boundaries of each underlying viewport in turn, in the reverse order to that in which the viewports are displayed;

(2) re-execute the flag fill sequence for each marked viewport in turn setting a new flag value for those cells previously overlaid by the current viewport;

(3) re-display each cell in the viewport and change the new flag value for the overlaid cells to the flag value assigned to the viewport being displayed; and having followed this procedure for all overlaid viewports;

(4) re-set the flags for the cells of the current viewport as longer displayed.

13. A method as claimed in claim 12 in which as real symbol storage locations within said read/write section of the generator are released as a result of viewport movement or deletion, said screen manager operates to chain the released storage locations together in a free list so as to be available for allocation for the storage of subsequent character and/or symbol cells are required.

14. A method as claimed in claim 13, in which as virtual symbol storage location within said allocated storage become available as a result of application deletion from the presentation space, the presentation space service amanger operates to chain the released storage locations together in a free list to be available for dynamic allocation fo rthe storage of new virtual symbols storage cells as required.

* * * * *